United States Patent [19]
Hartman

[11] 3,879,207
[45] Apr. 22, 1975

[54] GLASS FOR A FIBRE-OPTICAL ELEMENT

[75] Inventor: Christianus Johannes Maria Hartman, Emmasingel, Eindhoven, Netherlands

[73] Assignee: U.S. Philips Corporation, New York, N.Y.

[22] Filed: Mar. 27, 1973

[21] Appl. No.: 345,443

[30] Foreign Application Priority Data
Apr. 5, 1972 Netherlands ...................... 7204501

[52] U.S. Cl. .................. 106/54; 106/47 Q; 106/50
[51] Int. Cl. ......................... C03c 3/08; C03c 13/00
[58] Field of Search ............ 106/50, 54, 47 Q, 47 R

[56] References Cited
UNITED STATES PATENTS

| | | | |
|---|---|---|---|
| 3,460,954 | 8/1969 | Young | 106/50 |
| 3,503,764 | 3/1970 | Young | 106/50 |
| 3,650,780 | 3/1972 | Connelly | 106/50 |

Primary Examiner—Robert V. Hines
Assistant Examiner—Thomas A. Waltz
Attorney, Agent, or Firm—Frank R. Trifari

[57] ABSTRACT

A core glass for fibre optics having a composition between the following limits in percent by weight:

| | | | | |
|---|---|---|---|---|
| $B_2O_3$ | 4 – 10 | ) combined 14 – 26 | ZnO | 2 – 6 |
| $SiO_2$ | 10 – 20 | | $ZrO_2$ | 4 – 8 |
| $Al_2O_3$ | 1 – 4 | | $Nb_2O_5$ | 5 – 13 |
| $La_2O_3$ | 31 – 35 | | $Ta_2O_5$ | 2 – 10 |
| BaO | 12 – 16 | | | |

2 Claims, No Drawings

GLASS FOR A FIBRE-OPTICAL ELEMENT

The invention relates to glass having a high refractive index which is suitable as a core of glass fibres bundled in a fibre-optical element.

Such elements which are known, for example, from U.K. Patent Specification 1,108,509 have frequently been used in recent years where images having a very weak brightness are transported and where loss of definition due to dispersion must not occur. They are used, for example, in image intensifiers and television camera tubes. In these fibre-optical elements a bundle of a large number of fibres having a very small diameter is used.

The operation of such a fibre is such that a beam of light which impinges on one side on the end of the fibre remains substantially within the fibre by means of total reflection when it passes through this fibre and reaches the other end with substantially the same intensity. In order to realise this such a fibre consists of a cylindrical core of transparent material having a high refractive index $(n_1)$ which is concentrically surrounded by a cladding of glass having a low refractive index $(n_2)$. If necessary a layer of another material may be provided on the outer side of the cladding in order to absorb unwanted light in the fibre plate and to obtain an optimum transmission of the image. The aim is to make the value of $n_1$ as large as possible and that of $n_2$ as small as possible in order that the angle $\theta$ which may be constituted between the beam of light impinging upon the fibre-optical element and the normal on the end face of the fibre without escaping from the fibre is as large as possible. There is the following relation between this critical angle, the refractive indeces of the two kinds of glass and the refractive index of the ambiance $(n_0)$:

$$n_o \sin \theta = \sqrt{n_1^2 - n_2^2}.$$

It is to be noted that in this respect cylindrical is to be understood to mean any closed form, thus not only a circular but also rectangular or polygonal.

Glass for the fibre cores must satisfy a number of requirements. To obviate cathode poisoning during use in an image intensifier or a similar device PbO, CdO and halogens must be absent. Due to the risk of discolouration in the presence of traces of iron, $TiO_2$ must be absent. In connection with safety, $ThO_2$ and other radioactive materials are to be prevented. The use of expensive materials such as $GeO_2$, $In_2O_3$ and $Y_2O_3$ is to be limited as much as possible. The $B_2O_3$ content must not be too high because this promotes striae and devitrification during melting and moulding. As regards expansion and viscosity the glass must be adapted to the commonly used cladding glasses. The glass must not contain stones, crystalline products and the like and during the drawing process devitrification must not occur. Sources for dispersion phenomena due to diffusion, crystallisation and phase separation at the operating temperatures must not be produced at the boundary surface between the core and the cladding glass.

For the core material having a refractive index of approximately 1.80 borosilicate glasses are known which comprise lanthanum oxide, barium oxide, zirconium oxide, tantalum oxide and niobium oxide such as are described in the German published Patent Application No. 2,010,672 and have the following composition in percent by weight:

| | | | |
|---|---|---|---|
| $SiO_2$ | 0 – 20 ⎤ | $ZrO_2$ | 0 – 10 |
| $B_2O_3$ | 8 – 30 ⎬ together >20 | $Ta_2O_5 + Nb_2O_5$ | 0 – 25 |
| $GeO_2$ | 0 – 15 ⎦ | $TiO_2$ | 0 – 5 |
| $La_2O_3$ | 15 – 30 | $BaO + CaO$ | 5 – 25 |
| | | $Al_2O_3$ | 0 – 5 | or those which have been described in the German published Patent Application No. 1,596,867 having the following composition in percent by weight:

| | | | |
|---|---|---|---|
| $SiO_2$ | 0 – 10 | $BaO$ | 0 – 47 |
| $B_2O_3$ | 19 – 26 | $Ta_2O_5$ | 0 – 3 |
| $ZrO_2$ | 0 – 5 | $GeO_2$ | 0 – 2 |
| $La_2O_3$ | 12 – 31 | $Nb_2O_5 + WO_3 + TiO_2$ | 13 – 17. |
| $CdO$ | 0 – 32 | | |

It has been found in practice that these glasses have some drawbacks. In the first place it was found that $TiO_2$ can easily give rise to unwanted colouring in connection with iron impurities. Furthermore a larger quantity of $B_2O_3$, of 20 percent of more, is less preferable because a part sublimates therefrom during melting. Expensive materials such as $GeO_2$ and $Ta_2O_5$ should rather be replaced by cheaper materials.

An object of the invention is to provide a glass composition which does not have these drawbacks and whose physical properties are such that they can be used in combination with the common cladding glasses.

A commonly used cladding glass, is, for example, the following (in percent by weight):

| | | | |
|---|---|---|---|
| $SiO_2$ | 67.6 | $Na_2O$ | 0.4 |
| $B_2O_3$ | 19.0 | $K_2O$ | 8.4 |
| $Li_2O$ | 0.9 | $Al_2O_3$ | 3.6 |
| | | $As_2O_3$ | 0.1 | having a refractive index $n_D = 1.487$, a coefficient of expansion between 30° and 300°C of $51 \times 10^{-7}$, an annealing point of 505°C and a softening point of 715°C. Another cladding glass has the following composition:

| | | | |
|---|---|---|---|
| $SiO_2$ | 60.1 | $Al_2O_3$ | 3.9 |
| $B_2O_3$ | 22.6 | $Na_2O$ | 13.4 | having a refractive index $n_D = 1.50$, a coefficient of expansion between 30° and 300°C of $66.2 \times 10^{-7}$ per °C, an annealing point ($\log \eta = 13.4$) of 540°C and a softening point ($\log \eta = 7.65$) of 696°C. In order to be compatible therewith the coefficient of expansion of the core glass must be slightly higher so that compressive stress is present in the cladding glass and the softening point if 60° to 100°C higher which, as experience shows, leads to optimum results during the drawing process.

The glass composition according to the invention is characterized in that it is located within the following limits given in percent by weight:

| | | | | |
|---|---|---|---|---|
| $B_2O_3$ | 4 – 16 ⎤ | | $ZnO$ | 2 – 6 |
| $SiO_2$ | 10 – 20 ⎦ combined 14 – 26 | | $ZrO_2$ | 4 – 8 |
| $Al_2O_3$ | 1 – 4 | | $Nb_2O_5$ | 5 – 13 |
| $La_2O_3$ | 31 – 35 | | $Ta_2O_5$ | 2 – 10 |
| $BaO$ | 12 – 16 | | | | and preferably within the following limits:

| | | | | |
|---|---|---|---|---|
| $B_2O_3$ | 4 – 16 ⎫ | | ZnO | 3 – 5 |
| $SiO_2$ | 10 – 20 ⎬ combined 14 – 26 | | $ZrO_2$ | 6 – 8 |
| $Al_2O_3$ | 1 – 4 ⎭ | | $Nb_2O_5$ | 8 – 11 |
| $La_2O_3$ | 32 – 35 | | $Ta_2O_5$ | 4 – 6. |
| BaO | 12 – 15 | | | |

Some glass compositions according to the invention having the above-mentioned physical properties will now be described by way of example.

These glasses were made while starting from a mixture consisting of boric acid, quartz powder, alumina, lanthanum oxide, barium carbonate, zinc oxide, niobium oxide and tantalum oxide. This mixture was melted in a platinum crucible in an electrically fired furnace, that is to say, in a weakly oxidizing atmosphere. The glasses were introduced at 1,300°C, melted at 1,350°C, moulded at 1,280°C and tempered at 690°C.

|  | Composition in % by weight | | | | |
|---|---|---|---|---|---|
|  | 1 | 2 | 3 | 4 | 5 |
| $B_2O_3$ | 11.1 | 8.1 | 6.1 | 10.1 | 12.1 |
| $SiO_2$ | 14.1 | 16.1 | 18.1 | 14.1 | 12.1 |
| $Al_2O_3$ | 2.2 | 2.2 | 2.2 | 2.2 | 2.2 |
| $La_2O_3$ | 33.0 | 34.0 | 34.0 | 34.0 | 34.0 |
| BaO | 13.7 | 13.7 | 13.7 | 13.7 | 13.7 |
| ZnO | 3.7 | 3.7 | 3.7 | 3.7 | 3.7 |
| $ZrO_2$ | 7.0 | 7.0 | 7.0 | 7.0 | 7.0 |
| $Nb_2O_5$ | 10.2 | 10.2 | 10.2 | 10.2 | 10.2 |
| $Ta_2O_5$ | 5.0 | 5.0 | 5.0 | 5.0 | 5.0 |
| $n_D$ | 1.802 | 1.808 | 1.808 | 1.808 | 1.808 |
| $U C \times 10^7 (30-300°C)$ | 72.0 | 72.4 | 72.4 | 72.4 | 72.4 |
| $T_{log\eta} = 7,65^{(°C)}$ | 784 | 784 | 796 | 775 | 764 |

A glass tube was manufactured consisting of one of the two above-mentioned cladding glasses having a wall thickness of from 1 to 1.5 mms, an external diameter of 17.5 mms and a length of 300 mms.

A fitting ground cylinder was placed therein which consisted of glass having one of the five above-mentioned compositions.

The combinations thus obtained were first drawn out to fibres having a diameter of approximately 300 μ at a temperature of 770°–780°C. These fibres were bounded to a diameter of 12 mms and these bundles were again drawn out to 300 μ so that the original fibre had a diameter of approximately 6 μ. The obtained composed fibres were cut to lengths of 100 mms and bundled in a dense packing in an ampoule having a diameter of 25 mms of a borosilicate glass having a coefficient of expansion adapted to the fibre plate such as that of the following composition in percent by weight:

| | | | |
|---|---|---|---|
| $SiO_2$ | 62.4 | $Al_2O_3$ | 3.9 |
| $B_2O_3$ | 22.6 | $Na_2O$ | 11.1 |

The filled ampoule was evacuated, sealed, and heated for one-half to 1 hour at a temperature of 700°–725°C. Sheet-like fibre-optical elements were sawn from the product obtained and they were finally polished. The optical quality of these sheets is very satisfactory.

What is claimed is:

1. Glass having a high refractive index which is particularly suitable as a core of glass fibres bundled in a fibreoptical element and which consists essentially of the following constituents having between the following limits in percent by weight:

| | | | |
|---|---|---|---|
| $B_2O_3$ | 4 – 16 ⎫ combined 14 – 26 | ZnO | 2 – 6 |
| $SiO_2$ | 10 – 20 ⎬ | $ZrO_2$ | 4 – 8 |
| $Al_2O_3$ | 1 – 4 ⎭ | $Nb_2O_5$ | 5 – 13 |
| $La_2O_3$ | 31 – 35 | $Ta_2O_5$ | 2 – 10 |
| BaO | 12 – 16 | | | and wherein said glass has an index of refraction of about 1.802 to 1.808, has a coefficient of expansion from 30° to 300°C of about 72.0 to 72.4 × $10^{-7}$/°C. and has a softening point between 764°C and 796°C.

2. Glass as claimed in claim 1, wherein its composition lies within the following limits in percent by weight:

| | | | |
|---|---|---|---|
| $B_2O_3$ | 4 – 16 ⎫ combined 14 – 26 | ZnO | 3 – 5 |
| $SiO_2$ | 10 – 20 ⎬ | $ZrO_2$ | 6 – 8 |
| $Al_2O_3$ | 1 – 4 ⎭ | $Nb_2O_5$ | 8 – 11 |
| $La_2O_3$ | 32 – 35 | $Ta_2O_5$ | 4 – 6 |
| BaO | 12 – 15 | | |

* * * * *